US012704135B2

(12) United States Patent
Watson

(10) Patent No.: US 12,704,135 B2
(45) Date of Patent: Aug. 11, 2026

(54) SYSTEMS AND METHODS FOR REDUCING WEAR IN A RECIPROCATING PISTON PUMP

(71) Applicant: Spotton Corp., Arnprior (CA)

(72) Inventor: Sean Watson, Pakenham (CA)

(73) Assignee: Spotton Corp., Arnprior (CA)

( * ) Notice: Subject to any disclaimer, the term of this patent is extended or adjusted under 35 U.S.C. 154(b) by 0 days.

(21) Appl. No.: 18/966,269

(22) Filed: Dec. 3, 2024

(65) Prior Publication Data

US 2025/0188959 A1 Jun. 12, 2025

Related U.S. Application Data

(60) Provisional application No. 63/606,928, filed on Dec. 6, 2023.

(51) Int. Cl.

| | |
|---|---|
| ***F15B 11/08*** | (2006.01) |
| ***F04B 9/105*** | (2006.01) |
| ***F15B 3/00*** | (2006.01) |
| ***F15B 15/14*** | (2006.01) |

(52) U.S. Cl.
CPC .............. *F15B 11/08* (2013.01); *F04B 9/105* (2013.01); *F15B 3/00* (2013.01); *F15B 15/14* (2013.01)

(58) Field of Classification Search
CPC ........................................................ F15B 3/00
See application file for complete search history.

(56) References Cited

U.S. PATENT DOCUMENTS

| | | | | |
|---|---|---|---|---|
| 3,811,795 | A * | 5/1974 | Olsen | F03C 1/10 417/397 |
| 4,419,055 | A | 12/1983 | Burk | |
| 4,818,191 | A | 4/1989 | Schlake | |
| 4,946,352 | A | 8/1990 | Evenson | |
| 5,137,436 | A | 8/1992 | Vogel | |
| 8,186,972 | B1 | 5/2012 | Glauber | |
| 8,313,313 | B2 | 11/2012 | Juterbock et al. | |
| 9,695,840 | B2 * | 7/2017 | Rabhi | F15B 1/024 |
| 9,926,947 | B2 * | 3/2018 | Villar | F04B 9/133 |
| 2020/0063760 | A1 * | 2/2020 | Asahara | F15B 13/086 |

FOREIGN PATENT DOCUMENTS

| | | | | |
|---|---|---|---|---|
| DE | 202012006405 U1 * | 8/2012 | | F04B 9/127 |
| JP | 2018044589 A | 3/2018 | | |
| WO | 8801021 A1 | 2/1988 | | |

* cited by examiner

*Primary Examiner* — Thomas E Lazo
(74) *Attorney, Agent, or Firm* — GrowIP Law Group LLC

(57) ABSTRACT

Hydraulic pumping systems that reduce wear within a reciprocating piston pump are described. The system includes a hydraulic drive system having a first drive piston, a second drive piston and a work piston within a work cylinder having first and second working sides. The work piston connects each of the first and second drive pistons via first and second piston rods. The work chamber is configured to receive a fluid/gas to be pumped on the first and second working sides of the work piston and expel the fluid/gas from the first and second working sides of the work piston. A hydraulic fluid control system is configured to alternately direct hydraulic fluid to respective working sides of the first and second drive pistons such that the first and second piston rods are in tension during each working stroke of the work piston.

12 Claims, 5 Drawing Sheets

SYSTEMS AND METHODS FOR REDUCING WEAR IN A RECIPROCATING PISTON PUMP

CROSS-REFERENCE TO RELATED APPLICATION

This application is a U.S. Non-Provisional application that claims priority to and the benefit of U.S. Provisional Patent Application No. 63/606,928, filed on Dec. 6, 2023, that is hereby incorporated by reference in its entirety.

FIELD

The present disclosure relates to hydraulic pumping systems and more particularly, relates to systems and methods that reduce wear within a reciprocating piston pump that may be caused by contamination entering a piston chamber.

BACKGROUND

Referring to FIGS. 1-3, piston pumps can be used to move gases and liquids. A typical piston pump 5 includes a work chamber having a pumping cylinder 5*a*, a piston 5*b* and a piston rod 5*c* that sequentially applies compression and tension on the piston 5*b*. These pumps act as vacuum/compression devices to suck in gas and/or liquids through a one-way valve into the cylinder 5*a* and then push those contents out through a one-way valve under pressure (compression) as shown in FIGS. 2 and 3. Generally, pistons can be considered to have a working side/chamber 5*a* and a non-working side 5*a*'. Linear actuation of piston rod 5*c* may be achieved by any suitable actuation system including mechanical actuation means such as gears, rotating systems and hydraulic actuation systems. As shown in FIGS. 1-3, a linear actuation system is a drive chamber 6 having a drive cylinder 6*a* and drive piston 6*b* that is coupled to piston rod 5*c*.

Many applications for piston pumps are in environments where a contaminant (likely a damaging solid) will enter the work chamber 5 where the contaminant, depending on its nature, causes damage, which may lead to a reduced maintenance cycle and/or leads to premature failure of the pump. For the purposes of this description, and as shown in FIGS. 1-3, the typical pump includes a piston 5*b* running back and forth in the work chamber, that is pulled and pushed by piston rod 5*c* connected to the drive piston 6*b* that moves back and forth in the drive chamber 6*a*. As is known, the piston rod 5*c* is typically supported with a bushing 5*f* installed in between the two chambers, as shown in FIG. 1.

That is, in operation and as shown in FIG. 2, in the work chamber 5, as the drive piston 5*b* moves to the right, suction is created on one side of the work piston 5*b* drawing gas/fluid into the work chamber 5*a* while compression occurs on the other side of the work piston as the drive piston 6*b* travels in one direction (i.e., to the right). As shown in FIG. 3, when traveling in the opposite direction, the opposite occurs, causing gas/fluid in the work chamber 5*a* to be expelled from the work chamber. As the piston rod 5*c* is alternately under compression and tension, each stroke may be referred to as either the compression stroke or tension stroke.

As is known, actuation of the drive piston 6*b* is controlled by a hydraulic pump system that pumps fluid into and out of the drive chamber causing the drive piston 6*b* to move alternately in different directions. Various hydraulic pump systems may be configured to the drive chamber to effect hydraulic fluid pumping.

When the work piston 6*b* is being pushed, and particularly in systems where the piston rod 5*c* is long (for example where the stroke length exceeds twice piston diameter), the piston rod is subjected to a compression force, which causes the piston rod to bend, known empirically as "rod buckling" as shown in FIG. 4. As the length of the pump chamber becomes several multiples of the piston diameter, the buckling problem is further exacerbated. Many pumps in the oil industry may be up to about 4-10 feet long with pistons having diameters in the range of 12-16 inches.

In a typical working scenario, where the pump is configured to a gas well, gas may enter the pump at about 1 atm of pressure and ultimately enter a gas pipeline at around 10 atm (150 psi). In a push pump having a 12-inch diameter cylinder/piston and a 5 foot stroke, the piston rod would be 2.5+ inch diameter to provide 150 psi and 3.5+ inches for a 10 foot stroke pump. In a push pump having a 16-inch diameter cylinder/piston and a 5 foot stroke, the piston rod would be 3+ inch diameter to provide 150 psi and 4.5+ inches for a 10 foot stroke pump.

As such, and particularly when the work piston 5*b* and drive piston 6*b* are at the end of each stroke, substantially the entire length of the piston rod 5*c* is unsupported within the respective work and drive cylinders. The resulting deflection of the piston rod 5*c* also causes a deflection of the work piston 5*b* which can lead to particular wear issues.

Accordingly, there has been a need for improved pumping systems that minimize issues associated with rod buckling.

Various known pumping systems include U.S. Pat. Nos. 4,946,352, 8,313,313, 4,818,191, 4,419,055, 5,137,436, 8,186,972, WO 88/01021, and JP 2018044589.

SUMMARY

In accordance with the disclosure a reciprocating piston pump system is described, the system having: a hydraulic drive system having a first drive piston within a first drive cylinder and a second drive piston within a second drive cylinder; a work piston within a work cylinder having first and second working sides, the work piston connecting each of the first and second drive pistons via first and second piston rods; the work chamber configured to receive a fluid/gas to be pumped on the first and second working sides of the work piston and expel the fluid/gas from the first and second working sides of the work piston; a hydraulic fluid control system configured to alternately direct hydraulic fluid to respective working sides of the first and second drive pistons such that the first and second piston rods are in tension during each working stroke of the work piston.

In various embodiments:

- the hydraulic drive system is controlled by a hydraulic pump system having a hydraulic pump, hydraulic fluid tank and direction control valve to shuttle hydraulic fluid into and out of each drive chamber.
- the work cylinder is 5-10 feet.
- the work cylinder is 5 feet and the piston rod has a 1.75" diameter or less.
- the work cylinder is 10 feet and the piston rod has a 2" or less diameter.
- the work cylinder has an inner surface with honing textures.

The system further has first and second working sides inlet valves and first and second outlet valves configured to the first and second working sides of the working cylinder and where the first and second outlet valves have an opening pressure of greater than 100 psi.

the first and second sides inlet valves have an opening pressure less than 15 psi.

the hydraulic fluid control system is configured to stroke the work piston at 0.5-9 strokes per minute.

In another aspect, a method of controlling a hydraulic pump system is described, the method having the steps of:

a) pumping hydraulic fluid (HF) into the first drive cylinder to displace the work piston and second drive piston under tension and draw a gas/liquid into the first working side of the work cylinder while simultaneously expelling gas/liquid in second working side of the work cylinder under pressure from the work cylinder to complete a first stroke;

b) at an end of the first stroke in step a), pumping hydraulic fluid into the second drive cylinder to displace the work piston and first drive piston under tension and draw a gas/liquid into the second working side of the work cylinder while simultaneously expelling gas/liquid in first working side of the work cylinder under pressure from the work cylinder to complete a second stroke; and, c) repeating steps a) and b).

In various embodiments, gas on non-working sides of the drive cylinders is vented to atmosphere during each stroke and/or steps a)-c) are repeated at 0.5-9 strokes per minute.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

The present disclosure describes systems and methods for reducing wear in a hydraulic pumping system. Generally, the systems described herein incorporate a central work piston running back and forth in a hydraulic cylinder under control of two drive chamber pistons, that are hydraulically pulled in both directions via piston rods and that operate in tension through a drive cycle. The systems and methods reduce or substantially eliminate buckling of work piston rods by maintaining the work pistons in tension throughout the drive cycle thus ensuring that misalignment of the central piston is substantially eliminated. The systems and methods substantially reduce or delay damage caused by contamination that may enter the work cylinder while achieving a high-volume pumping rate of more than 90%.

INTRODUCTION

Figure 1:
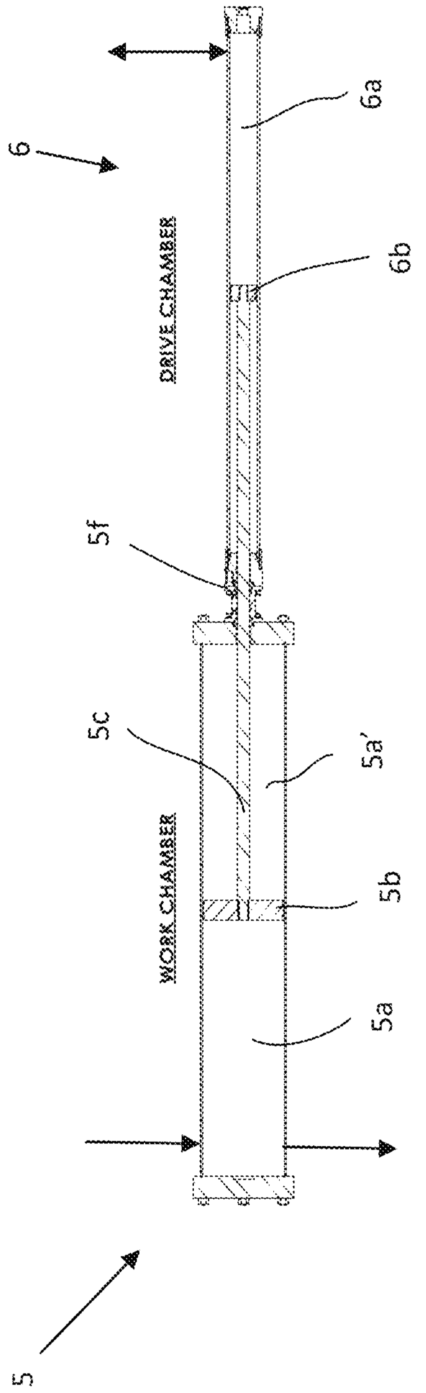
FIGURE 1 PRIOR ART
FIG. 1 shows a typical piston pump in accordance with the prior art.
Figure 2:
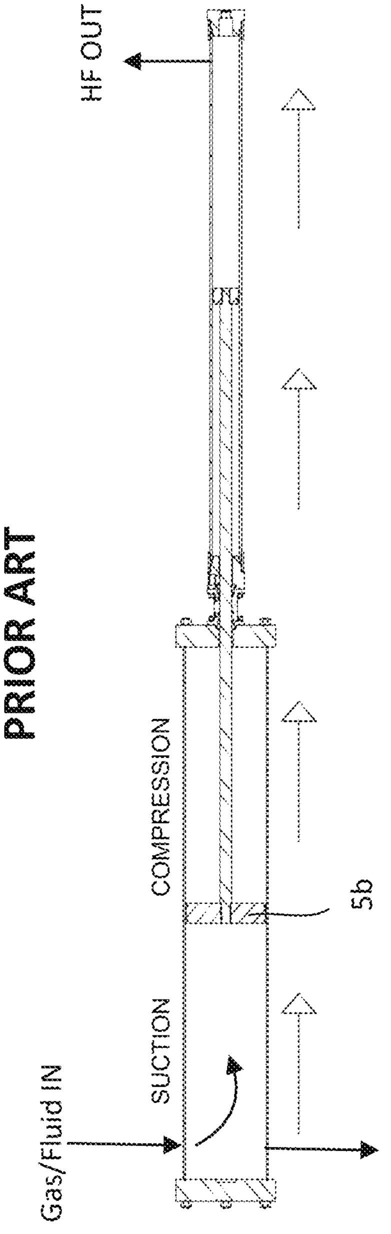
FIG. 2 and FIG. 3 shows a typical work chamber in accordance with the prior art showing how suction is created on one side of the piston while compression occurs on the other as the piston travels in the opposite direction.
Figure 3:
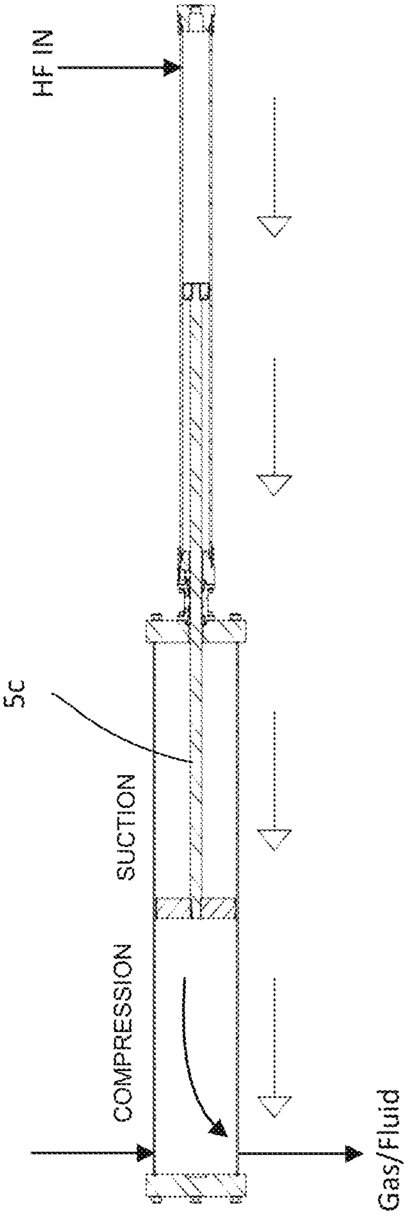
FIGURE 3 PRIOR ART
Figure 4:
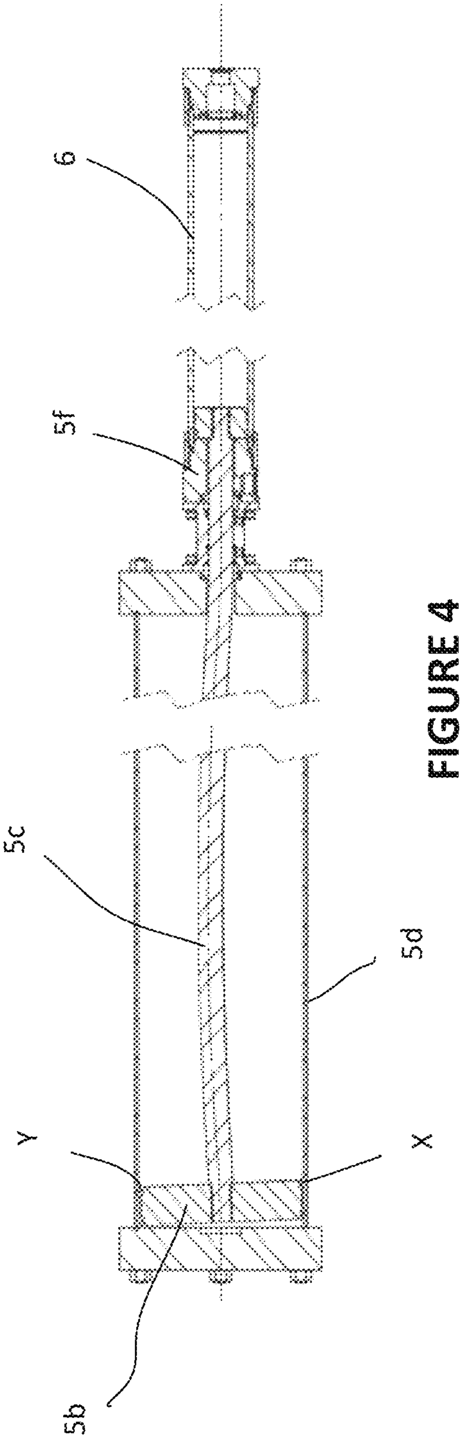
FIG. 4 shows a misalignment of the work piston with respect to the cylinder in accordance with the prior art.

In a typical pump system as described above, additional details of the phenomena of rod-buckling are described. Generally, if the piston rod 5*c* is long enough, under compression, the rod may bend in a “C” or an “S” shape causing a misalignment of the work piston with respect to the cylinder as shown in FIG. 4. Any misalignment results in a small gap X between one edge of the piston 5*b* and the cylinder 5*d* together with a narrowing Y on the opposite side of the deflection.

Figure 5:
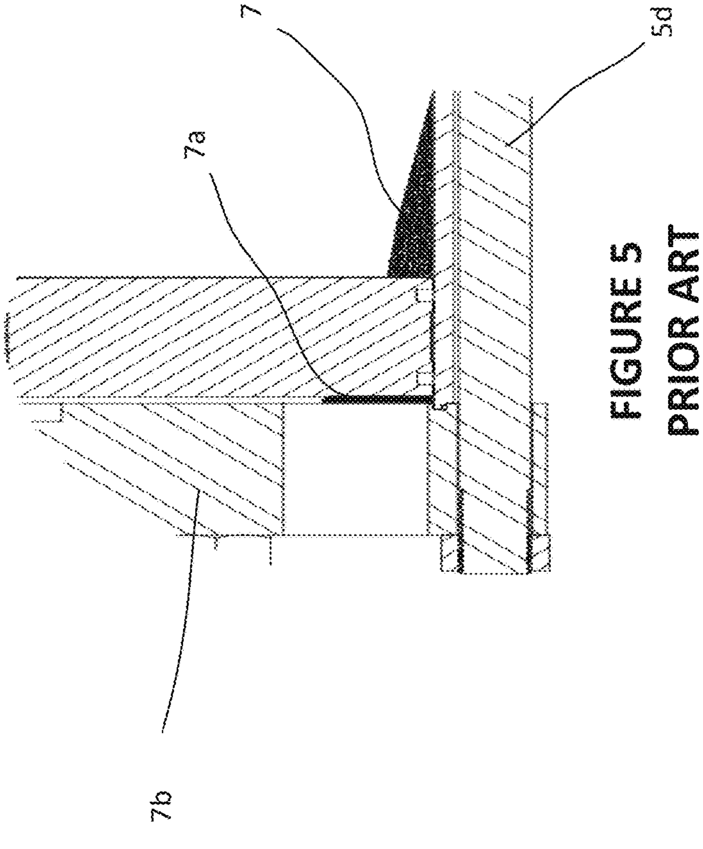
FIGURE 5 PRIOR ART
FIG. 5 shows contamination building up and getting trapped between the work piston and an end cap in accordance with the prior art.
Figure 6:
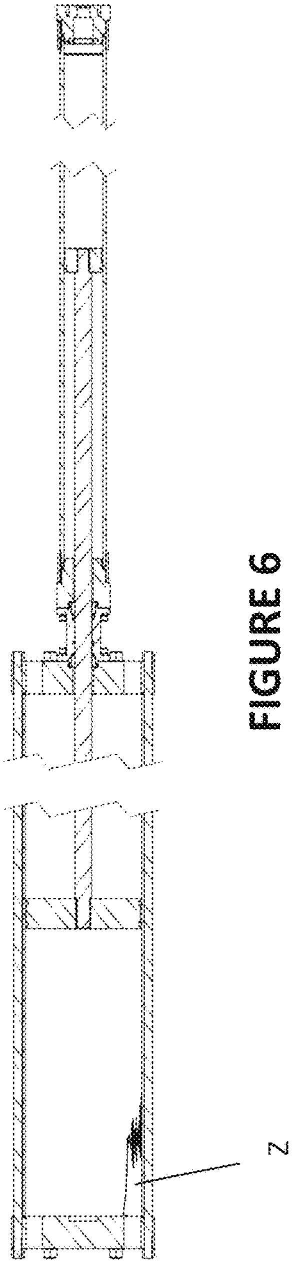
FIG. 6 shows gouges that can occur in the tube which are amplified towards the compression end of the cylinder in accordance with the prior art.

This deflection gap X typically happens towards the lower side of a horizontal work cylinder 5*d*, horizontal cylinders being the typical application of these long stroke cylinders. As the work chamber 5*d* is used to displace what may be contaminated fluids/gases, any contamination in the form of sand or grit 7, 7*a* or other debris will work its way into the shrinking gap which will abrade Z the work cylinder 5*d* and work piston 5*b* particularly during the return stroke as shown in FIGS. 5 and 6.

Furthermore, when the work piston 5*b* changes direction, the piston rod 5*c* is then put in tension and the work piston 5*b* centers itself in the tube which squeezes any contamination caught in the gap X between the work piston 5*b* and the wall also leading to wear Z. That is, when the rod goes into tension on the return stroke, the debris that is caught between the piston and cylinder is dragged back which can cause damage to both the piston and the cylinder. Examination of units that may have failed shows that the highest amount of damage typically occurs near to the end of the cylinder at the end of the piston stroke, which is the point of maximum buckling of the piston rod and where the piston may be maximally misaligned with the cylinder axis.

Examination of failed units having a 5-foot stroke, typically shows gouges in the cylinder that are deepest near the end of the piston stroke that taper off over about 2 feet. The remaining 3-foot section of the cylinder may have scratches but not gouges.

Moreover, depending on the type of contamination, the contamination can become embedded into the piston.

As the work piston 5*b* repeatedly travels back and forth, the contamination will progress the scratch into a damage causing gouge and/or several gouges, which in turn capture more and more contamination. The problem intensifies until the unit will no longer build adequate compression pressure and is deemed to have failed.

FIG. 5 shows contamination 7*a* building up and getting trapped between the piston and the end cap 7*b*. FIG. 6 shows the gouges Z that can occur in the tube which are amplified towards the compression end of the cylinder.

Figure 7:
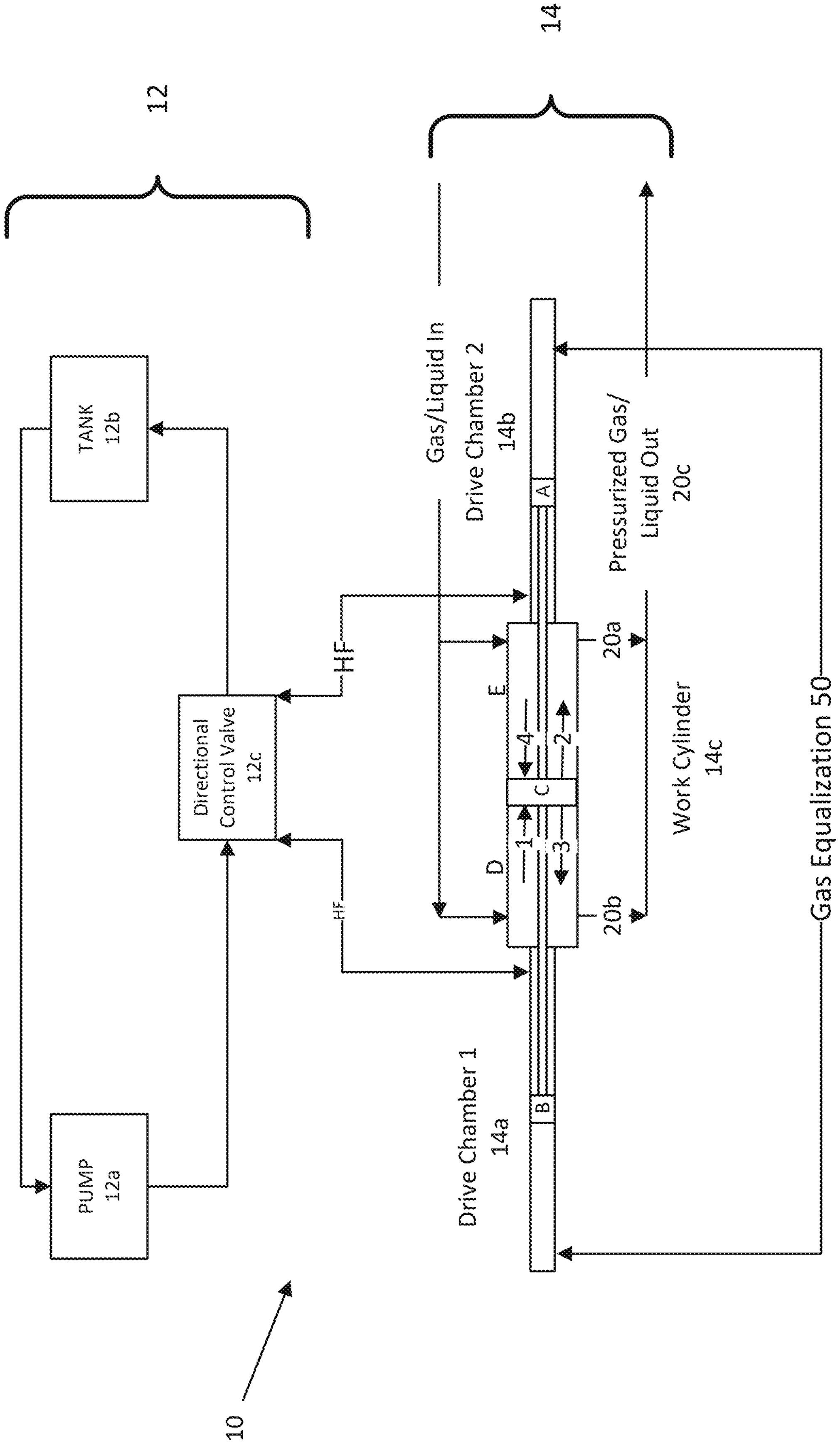
FIG. 7 shows a dual drive chamber and work chamber system in accordance with one embodiment.

Referring to FIG. 7, an improved system 10 is described. System 10 includes a hydraulic actuation system 12 and a hydraulic pump system 14. The hydraulic actuation system 12 includes a hydraulic pump 12*a*, a fluid reservoir 12*b* and directional control valves 12*c* to pump hydraulic fluid into hydraulic pump system 14. The hydraulic pump system 14 includes two drive chambers 14*a* and 14*b* disposed on opposite sides of a work chamber 14*c*. In operation, each of the drive chambers 14*a*, 14*b* alternately receives hydraulic fluid on a drive side of drive chambers 14*a* and 14*b*. Hydraulic fluid is alternately pumped to each drive chamber to move a piston C within work cylinder 14*c* which pumps a gas/liquid on both sides of the piston C. The hydraulic pump system will typically operate at 2-9 strokes per minute for 5-10 foot work cylinders.

The system works as follows using arbitrary number for the sequence of steps:

1) Hydraulic fluid (HF) is pumped into drive chamber 2 14*b* by moving piston A to the right. This simultaneously moves pistons B and C via piston rods B1,C1 under tension to the right.
2) Gas/liquid is drawn into work chamber D as shown by arrow 1.
3) Simultaneously, gas/liquid in work chamber E is expelled to pressurized gas/liquid line 20*a* (arrow 2).
4) At the end of the stroke, hydraulic fluid is then pumped into drive chamber 1 14*a* moving piston B to the left. This simultaneously moves pistons A and C via piston rods B1,C1 under tension to the left drawing gas/liquid in (arrow 4) and expelling gas/liquid to pressure line 20*b* (arrow 3).
5) Gas on the non-working side of chambers 1 and 2 is vented/equalized (preferably to the atmosphere) during each cycle via gas equalization line 50.

The process is controlled by the hydraulic actuation system 12 where HFs are successively passed through the directional control valves 12*c* to and from reservoir 12*b*. The cycle is repeated such that drive chamber piston rods 1 and C1 are always under tension.

Figure 8:
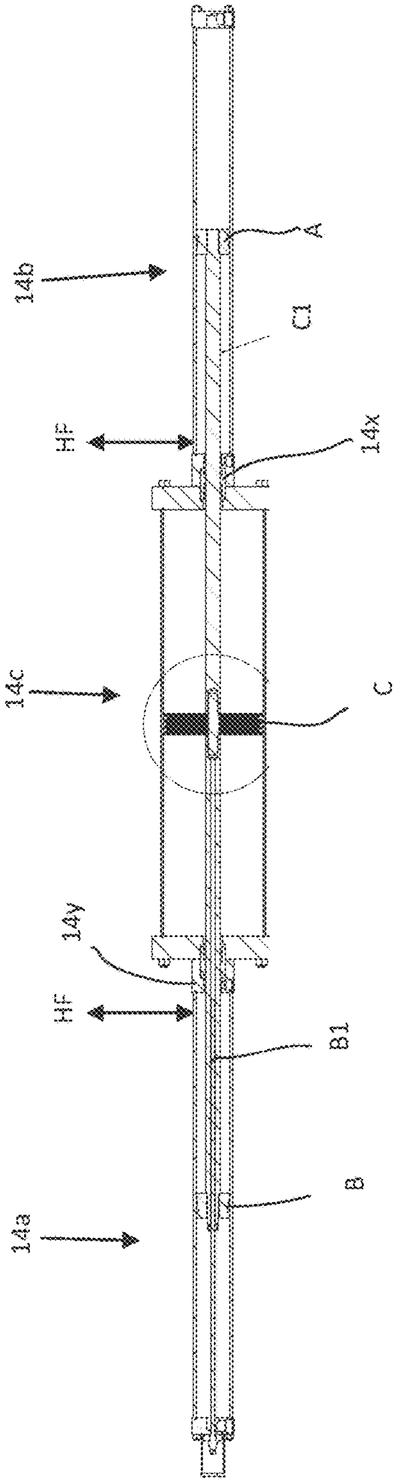
FIG. 8 illustrates a magnified cross-sectional view of the design of a hydraulic pump system in accordance with one embodiment.
Figure 9:
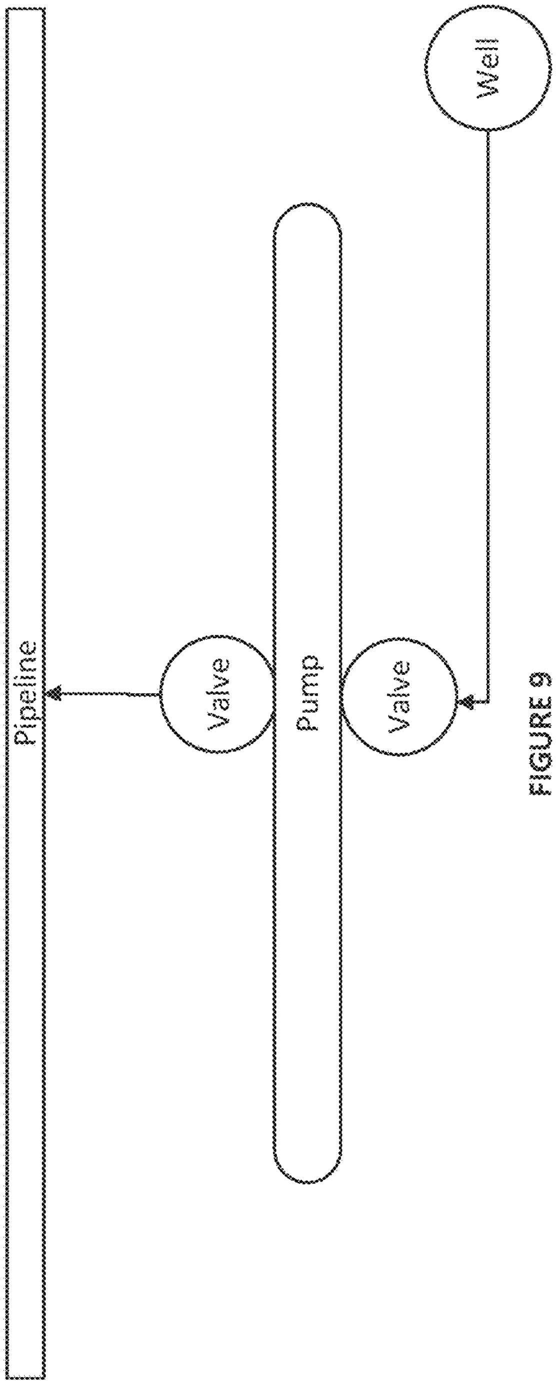
FIG. 9 illustrates deployment of a hydraulic pump in accordance with one embodiment.

Additionally, as shown in FIG. 8, it is noted that each piston rod B1 and C1 is supported by additional bushings 14*x*, 14*y* thus reducing the span of the piston rods during all phases of the cycle as compared to a prior art piston rod.

In operation, the present system can substantially reduce wear in a hydraulic pump by reducing/eliminating buckling of piston rods and/or misalignment of the work piston C during the drive cycle. That is, by reducing/eliminating buckling and misalignment, the problems of contamination working its way between surfaces are reduced resulting in reduced wear and longer operational life of the work cylinder.

That is, contamination that enters the work cylinder 14*c* is processed through the work cylinder 14*c* without it being trapped against the wall of the work cylinder 14*c*. Whenever the work piston C is traveling while still being in the center of the hydraulic cylinder 14*c*, the contamination is simply pushed along the walls and not trapped against the walls and/or between the work cylinder 14*c* walls and work piston C.

In a typical pumping system, where it is desired to maximize the volume of fluid/gas being pumped, it is desired to maximize the diameter of the work piston and the length of the work cylinder. Generally, as noted above, as the length of work cylinder increases, the buckling and misalignment issue becomes greater. While larger pistons have a greater thickness, and larger diameter piston rods can be employed to help reduce misalignment problems, larger pistons and piston rods increase the mass of the system while simultaneously reducing the working volume within the work cylinder. The increase in mass then requires an increase in input power to actuate the system as a heavier mass is being accelerated/moved with each stroke. The energy efficiency of the pump is therefore decreased. In addition, and similarly, as noted the pumping volume is decreased which further decreases the operational efficiency of the pump.

Further, any buckling can affect the flow characteristics of gas/fluids entering/leaving the work chamber as the piston speed varies as buckling occurs leading to a varied pump speed. This can affect monitoring of the process as variations in speed can provide varied or inconsistent readings to equipment.

Accordingly, the subject system achieves at least the following operational advantages namely reducing the mass/thickness of work piston C and maximizing the volumetric efficiency of the pump.

A comparison of push/pull pumps and pull-only compressor pumps having a 5-foot and 10-foot stroke length is shown in Table 1. In each case the output pressure is 150 psi for the push/pull (prior art) pumps and 350 psi for the pull-only pumps. Stroke volumes are shown for a single stroke.

| Parameter | Push/Pull Output Pressure 150 psi | Pull Only Output Pressure 350 psi |
|---|---|---|
| 12" Cylinder - 5-foot stroke | | |
| Rod Diameter (inches) | 2.5" | 1.75" |
| Cylinder Volume | 6782 $in^3$ | 6782 $in^3$ |
| Rod Volume | 294 | 144 |
| Stroke Volume per cycle | 6488 | 6638 |
| Stroke Volume % | 100 | 102 |
| 12" Cylinder - 10-foot stroke | | |
| Rod Diameter (inches) | 3.5" | 1.75" |
| Cylinder Volume | 13564 $in^3$ | 13564 $in^3$ |
| Rod Volume | 659 | 288 |
| Stroke Volume | 12905 | 13276 |
| Stroke Volume % | 100 | 103 |
| 16" Cylinder (5-foot Stroke) | | |
| Rod Diameter (inches) | 3" | 2" |
| Cylinder Volume | 12057 | 12057 |
| Rod Volume | 424 | 188 |
| Stroke Volume | 11633 | 11899 |
| Stroke Volume % | 100 | 102 |
| 16" Cylinder (10-foot Stroke) | | |
| Rod Diameter (inches) | 4.5" | 2" |
| Cylinder Volume | 24114 | 24114 |
| Rod Volume | 1907 | 376 |
| Stroke Volume | 22207 | 23738 |
| Stroke Volume % | 100 | 107 |

From the table, it can be seen that the pull-only pumps can be configured with substantially smaller piston rods which improves the volumetric efficiency (between 2-7% in typical configurations) while enabling higher pumping pressures of comparable pumps.

It should be noted that while a pull-only pump requires a second drive piston and rod within a second drive cylinder that doubles with a higher mass compared to a single drive cylinder and work cylinder, it is proportionally smaller compared to two push/pull pumps and has greater volumetric pumping equipment with an increased service life.

In various embodiments, during cylinder manufacture, the cylinders are honed to include a "rifling" pattern in the cylinder. The rifling pattern is a series of spirals within the tube that may be about 0.0002"-0.0004" inches in depth. The rifling pattern enables a small film of oil to be retained on the bore to lubricate the piston as it moves through the bore. In addition, the spirals may cause the piston to rotate as it moves back and forth within the tube. Buckling has a tendency to prevent this rotation both due to the side forces on the piston and the effect of debris caught as described above. In addition, debris will create gouges/scratches that are deeper than the spirals which then prevent them from being effective.

Importantly, the longer a piston spirals, this can further minimize damage to the pistons and cylinders as new surfaces of pistons and cylinders are being exposed to one another over time. This spiraling motion can further minimize the likelihood of gouging or scratching between the pistons and cylinders occurring as specific contact between areas of the piston wall and cylinder wall will vary over time.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A reciprocating piston pump system, the system comprising:

- a hydraulic drive system having a first drive piston within a first drive cylinder and a second drive piston within a second drive cylinder;
- a work piston within a work cylinder having first and second working sides, the work piston connecting each of the first and second drive pistons via first and second piston rods;
- the work chamber configured to receive a fluid/gas to be pumped on the first and second working sides of the work piston and expel the fluid/gas from the first and second working sides of the work piston;
- a hydraulic fluid control system configured to alternately direct hydraulic fluid to respective working sides of the first and second drive pistons such that during each working stroke, the first and second drive piston rods operate in a tensile-load mode that maintains the first and second drive piston rods in a straight, aligned condition, thereby stabilizing the work piston in a centered position within the work cylinder and reducing buckling.

2. The system as claimed in claim 1, wherein the hydraulic drive system is controlled by a hydraulic pump system having a hydraulic pump, a hydraulic fluid tank and a direction control valve to shuttle the hydraulic fluid into and out of each of one or more drive chambers.

3. The system as claimed in claim 1, where the work cylinder is 5-10 feet.

4. The system as in claim 3, where the work cylinder is 5 feet and the piston rod has a 1.75" diameter.

5. The system as in claim 3, where the work cylinder is 10 feet and the piston rod has a 2" diameter.

6. The system as claimed in claim 1, wherein the work cylinder has inner surface with honing textures.

7. The system as claimed in claim 1, further comprising first and second working sides inlet valves and first and second outlet valves configured to the first and second working sides of the working cylinder and where the first and second outlet valves have an opening pressure of greater than 150 psi.

8. The system as in claim 7, where the first and second sides inlet valves have an opening pressure less than 15 psi.

9. The system as claimed in claim 1, where the hydraulic fluid control system is configured to stroke the work piston at 0.5-9 strokes per minute.

10. A method of controlling a hydraulic pump system as in claim 1, comprising the steps of:

a. pumping hydraulic fluid (HF) into the first drive cylinder to displace the work piston and second drive piston under a tensile-load mode of the first and second piston rods that maintains central rod alignment and draw a gas/liquid into the first working side of the work cylinder while simultaneously expelling gas/liquid in second working side of the work cylinder under pressure from the work cylinder to complete a first stroke;

b. at an end of the first stroke in step a), pumping hydraulic fluid into the second drive cylinder to displace the work piston and first drive piston under a tensile-load mode of the first and second piston rods that maintains central rod alignment tension and draw a gas/liquid into the second working side of the work cylinder while simultaneously expelling gas/liquid in first working side of the work cylinder under pressure from the work cylinder to complete a second stroke; and, c. repeating steps a) and b).

11. The method as in claim 10, where gas on non-working sides of the drive cylinders is vented to atmosphere during each stroke, the venting being coordinated with a tensile-load operating mode of the piston rods to maintain centered piston motion during the working strokes.

12. The method as in claim 10, where steps a)-c) are repeated at 0.5-9 strokes per minute.

* * * * *